United States Patent
Alger-Meunier

[11] Patent Number: 5,903,567
[45] Date of Patent: May 11, 1999

[54] METHOD OF DATA TRANSMISSION

[75] Inventor: Michael Alger-Meunier, Haar, Germany

[73] Assignee: Siemens Aktiengesellschaft, Munich, Germany

[21] Appl. No.: 08/808,188

[22] Filed: Feb. 28, 1997

[30] Foreign Application Priority Data

Feb. 29, 1996 [DE] Germany .............................. 196 07 725

[51] Int. Cl.$^6$ ...................................................... H04J 3/16
[52] U.S. Cl. ............................................................. 370/468
[58] Field of Search .................................. 370/442, 524, 370/522, 470, 472, 503, 510, 509, 511, 513, 514, 518, 520, 521, 337, 321, 347, 465, 468, 516

[56] References Cited

U.S. PATENT DOCUMENTS

| | | | |
|---|---|---|---|
| 4,398,290 | 8/1983 | Mathieu et al. | 370/60 |
| 4,761,635 | 8/1988 | Arnaune et al. | 340/347 |
| 4,763,319 | 8/1988 | Rozenblit | 370/79 |
| 5,271,001 | 12/1993 | Hadano | 370/13 |
| 5,331,320 | 7/1994 | Cideciyan et al. | 341/55 |

FOREIGN PATENT DOCUMENTS 38 43 372 A1  7/1989  Germany .

OTHER PUBLICATIONS

L. W. Couch II, "Digital And Analog Communication Systems", 4$^{th}$ Edition, New York, 1993, pp. 206–223.

*Primary Examiner*—Don N. Vo
*Attorney, Agent, or Firm*—Hill & Simpson

[57] ABSTRACT

A method of data transmission for transmitting by a clocked transmission device discretized data incorporated in block form into a frame structure, the amount of data grouped together respectively in a block being variable and the clock frequency of the transmission device being changed according to this amount of data in such a way that the frame structure and frame length are maintained.

10 Claims, 1 Drawing Sheet

METHOD OF DATA TRANSMISSION

BACKGROUND OF THE INVENTION

1. Field of the Invention

The present invention relates generally to a method of data transmission for transmitting via a clocked transmission device binary-coded data incorporated in block form into a time frame structure with constant frame length.

2. Description of the Related Art

Transmission systems which operate by the PCM-2 (PCM=Pulse Coded Modulation) method use a transmission technique that is customary in the case of ISDN networks (ISDN=Integrated Services Digital Network) to transmit two voice channels from the exchange, such as a telephone exchange, to the subscriber on a pair of copper wires. The two 64-kbit/s B channels which are available with ISDN systems are connected via a corresponding adapter in the exchange to two ports of an analog line termination circuit and at the subscriber to two analog telephones. In this case, which corresponds to analog telephones, each of the two subscribers is provided with a 64-kbit/s channel. Consequently, each subscriber can use fast fax machines without any loss in power.

If, in addition, the voice data are compressed during transmission, the capacity of an ISDN transmission device is available to a still greater number of analog subscribers. However, transmission by fast fax machines unfortunately suffers.

Transmission in accordance with the HDSL standard (ETSI RTR/TM 3036) provides a frame length of 6 ms, wherein the information is reduced from two bit lengths to a quaternary symbol, in other words, a so-called quat, during transmission. This results in a bit rate which is equal to twice the band rate. The nominal length of an HDSL frame is 6 ms. The number of quats per HDSL frame depends on the respective operating mode, two operating modes (namely the E1 and T1 operating modes) being standardized. The data within an HDSL frame are divided over four blocks, so-called payload blocks, with in each case 12 groups, which begin with a start bit (a Z bit), which is followed by a number of payload bits. Since 4×12 z bits are transmitted in a 6-ms period, there is additionally an 8-kb/s channel available. The number of bits transmitted after every Z bit is equal to the number of 64-kb/s channels which are transmitted over a line. Consequently, the operating mode T1 comprises 12 bits after every z bit, while the operating mode E1, which does not have the 8-kb/s channel, has 18 bits after every Z bit.

The average length of an HDSL frame in a T1 operating case is 2352 quats in 6 ms. Each individual frame contains either no filling quats or two filling quats, 6−1/392 ms or 2353 quats in 6+1/392 ms. The average length of the HDSL frame for the E1 operating case is 3504 quats in 6 ms. Each individual frame in this case comprises no filling quats or two filling quats, so that an actual length of 3503 quats in 6−1/584 ms or 3505 quats in 6+1/584 ms is obtained. PCM-11 systems use, for transmission in accordance with the HDSL standard, 11 our of 12 B channels for 11 analog subscribers and the 12th B channel is used for signaling information. In this case, the 11 subscribers enjoy the full 64-kbit/s service. However, the remote feeding of the power for the terminal devices is problematical here. Although the data rate is increased by use of the HDSL standard, the power which can be transmitted for feeding to the terminal devices is limited owing to the series resistance of the line. For example, in the case of a PCM-11 system, 11 time the power required by a subscriber station plus the power which the PCM system itself requires, would have to be provided. Consequently, in some applications there are limitations to the line length which are caused only the feed voltage that is available in the exchange. Here, other data rates, for example 5 or 9 B channels—would be desirable in order, on the one hand, to minimize the power consumption and, on the other hand, to optimize the line length or connect the maximum number of subscribers to a given connection.

So far it has only been possible by means of transmission in accordance with the HDSL standard to realize PCM-n systems (for values of $4 \leq n \leq 11$) with the full 64-kbit/s data rate per subscriber. The remaining channels between 12 or 18 and n were unused in these cases. The power consumption of the system was consequently not at an optimum and the achievable range was only that of the PCM system with 12 or 18 channels. In this case, the range decreases as the data rate increases.

SUMMARY OF THE INVENTION

The object of the present invention is to provide a method of data transmission, and an arrangement for implementing the method, in which these disadvantages do not occur.

This and other objects and advantages are achieved according to the invention by a method of data transmission for transmitting by means of a clocked transmission device discretized data incorporated in block form into a frame structure, wherein the amount of data grouped together in each block is variable and the clock frequency of the transmission device is changed according to this amount of data in such a way that the frame structure and frame length are maintained. Refinements and developments of the invention provide that each frame begins with a synchronization word. Preferably, the blocks are grouped together in groups having the same number of blocks. Each group begins with a group start word, which is then followed by the respective blocks of a group. Alternately, each block begins with a block word, which is then followed by a specific number of payload words. The number of payload words per block is variable and determines the total amount of data to be transmitted. The payload words of a block are respectively assigned to a pulse-code-modulated transmission channel.

In one embodiment a frame is ended by at least one filling word. The data to be transmitted are quaternary-coded.

A clocked data transmission device for transmitting discretized data incorporated in block form into a frame structure, provides that the amount of data grouped together respectively in a block is variable and the means for changing the clock frequency of the transmission device in dependence on this amount of data are provided, the frame structure and frame length being maintained.

The method of data transmission according to the invention for transmitting by means of a clocked transmission device discretized data incorporated in block form into a frame structure provides that the amount of data grouped together in a block is variable and that the clock frequency of the transmission device is changed according to this amount of data in such a way that the frame structure and frame length are maintained. A corresponding, clocked data transmission device for transmitting discretized data incorporated in block form into a frame structure includes means for changing the clock frequency of the transmission device depending on the variable amount of data to be transmitted as a block, wherein the frame structure and frame length are maintained.

If the data rate is changed, there are correspondingly more or fewer B channels. To maintain the frame structure in this case, the entire transmission device, i.e. all the components which are relevant to the transmission operation, such as for example the echo compensator, equalizer, clock recovery unit etc., is/are operated correspondingly faster or slower by means of suitable clock sources. Since the signal processing operation is based on a specific number of steps per symbol, this produces a corresponding scaling of all the processes necessary in the transmission operation. The overall data rate for n number of B channels is n×64+16 kbit/s. Since, for PCM-n Systems, generally an additional channel for signaling information is required, altogether n+1 channels will be provided. The method of transmission according to the present invention is suitable in particular for transmission devices which operate in accordance with the HDSL standard.

For this purpose, the invention provides in particular that each frame begins with a synchronization word and/or that the blocks are grouped together in groups having the same number of blocks. In addition, it may be provided that each group begins with a group start word, which is then followed by the respective blocks of a group. Similarly, each block may begin with a block start word, which is then followed by a specific number of payload words. The number of payload words per block may in this case be variable and consequently determine the total amount of data transmitted. Preferably, the payload words of a block are respectively assigned to a pulse-code-modulated transmission channel. Finally, it may be provided that a frame is ended by a terminating word and/or that the data to be transmitted are quaternary-coded.

BRIEF DESCRIPTION OF THE DRAWINGS

The invention is explained in more detail below with reference to the exemplary embodiments represented in the figures of the drawing, in which.

DETAILED DESCRIPTION OF THE PREFERRED EMBODIMENTS

Figure 1:
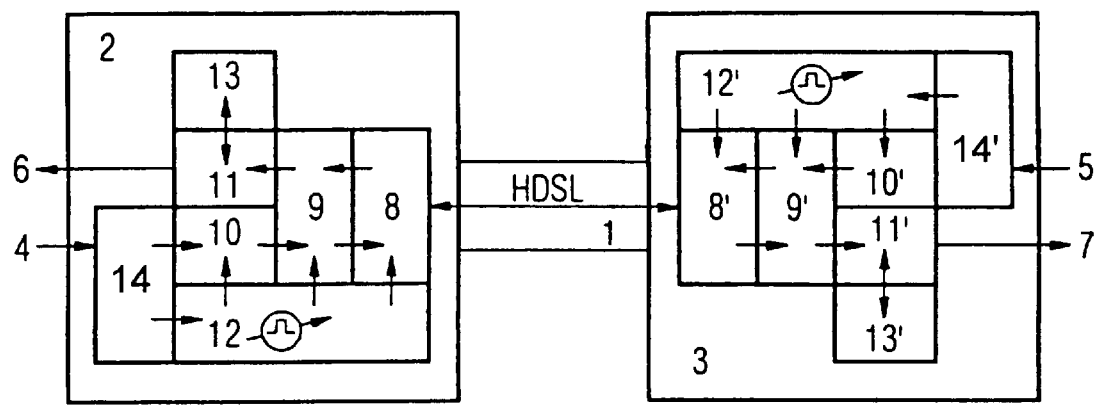
FIG. 1 is a block circuit diagram which shows a data transmission system according to the invention for implementing the method of data transmission according to the invention and FIG. 2 is a schematic diagram which shows the frame structure used in the case of the data transmission system according to FIG. 1.

The transmission device of the exemplary embodiment according to FIG. 1 includes a transmission medium 1, which is provided for example by a transmission line. Coupled to the transmission medium 1 are two transmitting/receiving devices 2 and 3. The transmitting/receiving devices 2 and 3 in each case receive binary-coded data 4 or 5, respectively, which they edit and transmit via the transmission medium 1 to the respectively other transmitting/receiving device 3 or 2. The data 6 or 7 respectively received by the transmitting/receiving devices 2 and 3 are passed on to corresponding units, that is not represented in detail in the drawing.

In the case of the present exemplary embodiment the transmission of data via the transmission medium 1 takes place in accordance with the HDSL standard. For this purpose there are provided in the case of the transmitting/receiving devices 2 and 3, inter alia, echo compensators 8 and 8', equalizers 9 and 9', and also means 10 and 10' for generating HDSL frames from the data 4 or 5 respectively received. In addition, there are means 11 and 11' which obtain the data 6 and 7 from the HDSL frames received.

Furthermore, the transmitting/receiving devices 2 and 3 include means 12 or 12', respectively, for generating a clock signal. The respective clock signal is fed to all the components that is relevant to the transmission operation, that is to say, inter alia, to the echo compensators 8 or 8', the equalizers 9 or 9' and also a unit 13 or 13' for clock recovery. The frequency of the generated clock signal is in this case variable and is set by a corresponding control device 14 or 14', depending on the amount of data 4 or 7, respectively, to be transmitted. If the amount of data does not change frequently or predictably, a manual setting of the means 12 may also be carried out instead of the automatic setting by means of the control device 14 or 14'.

Figure 2:
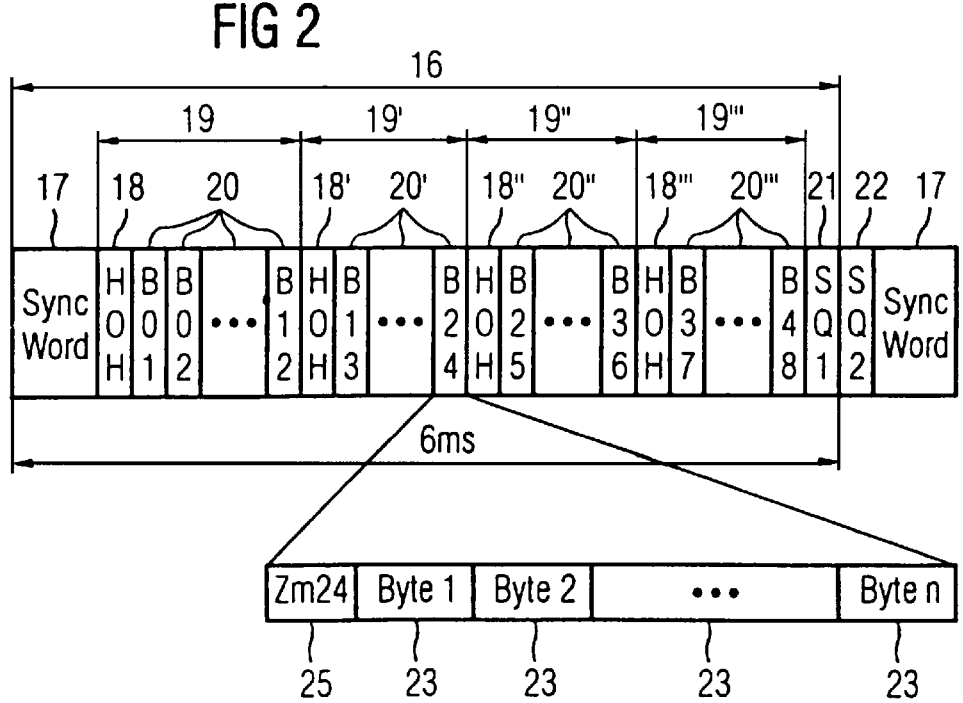

Represented in FIG. 2 is an HDSL frame 16, with a frame length of 6 ms, to be transmitted by means of the transmitting/receiving devices 2 and 3. The frame begins with a synchronization word 17, which is followed by a group start word 18. The group start word 18 introduces a group 19, which has, apart from the group start word 18, twelve blocks 20 following the latter. The group 19 is followed by three more groups 19', 19" and 19"', which are introduced in each case by a group start word 18', 18" and 18"' and likewise have in each case twelve blocks 20', 20" and 20"'. The last group 19"' is followed by filling words 21 and 22.

A block in this case respectively comprises n payload words 23, which each have for example the length of one bit. At the beginning of a block there is in each case a Z bit 24 to identify the beginning of a block. The number n of payload words 23 is in this case variable and determines the block length, and consequently determines the amount of data to be transmitted. In order to maintain the frame length of 6 ms and the frame structure in spite of a differing amount of data, and consequently differing block lengths, the clock frequency is correspondingly reduced or increased at the means 12 or 12', wherein an increasing amount of data is accompanied by the clock frequency being increased. Since the signal processing is based on a specific number of steps per symbol, a corresponding scaling of all the processes is provided.

Altogether, this produces a transmission rate of n×64 kb/s. In addition, an excess of 8 kb/s is kept available, which is necessary for the synchronization and operation of the transmission medium 1. In addition, 8 kb/s are provided for a transparent Z channel. Consequently, the overall bit rate transmitted on a paired line with transmission in accordance with the HDSL standard is n×64 kb/s+16 kb/s, n being the number of B channels transmitted. As a result, data can be transmitted at a suitable band rate, whereby the power consumption can be reduced and the loop length increased. The number of B channels on a line pair can in this case be chosen, for example, between n=4 and n=18. However, other values for n are also possible in the same way. In any event, however, the HDSL frame remains 6 ms long. However, the band rate transmitted depends on n.

Although other modifications and changes may be suggested by those skilled in the art, it is the intention of the inventors to embody within the patent warranted hereon all changes and modifications as reasonably and properly come within the scope of their contribution to the art.

I claim:

1. A method of transmitting discretized data over an HDSL transmission line using a clocked transmission device, comprising the steps of:

grouping an amount of data together in a block of variable size;

grouping an amount of blocks together in a frame; and adapting the clock frequency of the transmission device to the amount of data in such a way that the frame structure and frame length are maintained.

2. A method of data transmission according to claim 1, further comprising the step of:

beginning each frame with a synchronization word.

3. A method of data transmission according to claim 1, further comprising the step of:

grouping the blocks together in groups having a same number of blocks.

4. A method of data transmission according to claim 3, further comprising the steps of:

beginning each group with a group start word; and following said group start word with blocks of a group.

5. A method of data transmission according to claim 1, further comprising the steps of:

beginning each block with a block word;

following said block word with a specific number of payload words.

6. A method of data transmission according to claim 5, further comprising the step of:

varying a number of payload words per block so that said number of payload blocks determines a total amount of data to be transmitted.

7. A method of data transmission according to claim 6, further comprising the step of:

assigning the payload words of a block to a pulse-code-modulated transmission channel.

8. A method of data transmission according to claim 1, further comprising the step of:

ending a frame by at least one filling word.

9. A method of data transmission according to claim 1, further comprising the step of:

transmitting the data as a quaternary code.

10. A clocked data transmission device for transmitting discretized data incorporated in block form into a frame structure over an HDSL transmission line, comprising:

means for grouping an amount of data together in a block of variable size;

means for grouping an amount of blocks together in a frame; and means for adapting a clock frequency of said transmission device to the amount of data so that a frame structure and frame length are maintained.

\* \* \* \* \*